United States Patent
Inoue

(10) Patent No.: US 10,603,788 B2
(45) Date of Patent: Mar. 31, 2020

(54) ROBOT SIMULATION APPARATUS

(71) Applicant: FANUC CORPORATION, Yamanashi (JP)

(72) Inventor: Kouzou Inoue, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 226 days.

(21) Appl. No.: 15/676,109

(22) Filed: Aug. 14, 2017

(65) Prior Publication Data

US 2018/0065249 A1 Mar. 8, 2018

(30) Foreign Application Priority Data

Sep. 5, 2016 (JP) ................................. 2016-173015

(51) Int. Cl.
*B25J 9/16* (2006.01)
(52) U.S. Cl.
CPC .................... *B25J 9/1605* (2013.01)
(58) Field of Classification Search
None
See application file for complete search history.

(56) References Cited

U.S. PATENT DOCUMENTS

| | | | |
|---|---|---|---|
| 4,613,277 A * | 9/1986 | Guay | B25J 15/0475 294/902 |
| 5,835,693 A * | 11/1998 | Lynch | B25J 9/1605 345/473 |
| 6,246,468 B1 * | 6/2001 | Dimsdale | G01B 11/002 356/4.02 |
| 8,825,452 B2 * | 9/2014 | Shono | G06F 17/50 703/1 |
| 2003/0090489 A1 | 5/2003 | Watanabe et al. | |

(Continued)

FOREIGN PATENT DOCUMENTS

| | | |
|---|---|---|
| DE | 102006059829 A1 | 6/2008 |
| EP | 1310338 A2 | 5/2003 |

(Continued)

OTHER PUBLICATIONS

Japanese Office Action dated Sep. 25, 2018, for Japanese Patent Application No. 2016-173015.

(Continued)

*Primary Examiner* — Rehana Perveen
*Assistant Examiner* — Nithya J. Moll
(74) *Attorney, Agent, or Firm* — Karceski IP Law, PLLC

(57) ABSTRACT

A robot simulation apparatus includes an information setting unit that sets a type of one or more hands provided on the tool; a storage unit that stores types of the hands in association with three-dimensional models and tool coordinate systems of the hands; a hand position and posture setting unit that sets a position and a posture of each of the hands of the tool attached to an attachment surface of a robot; and a generation unit that generates a three-dimensional model of the robot, in which the three-dimensional model of the hands read based on the set type of the hand is attached to the attachment surface based on the set positions and postures, and that sets a tool coordinate system. The generated three-dimensional model and tool coordinate system are used to perform a simulation of the robot provided with the tool attached to the attachment surface.

6 Claims, 9 Drawing Sheets

(56) References Cited

U.S. PATENT DOCUMENTS

| | | |
|---|---|---|
| 2004/0128029 A1 | 7/2004 | Kato et al. |
| 2005/0080515 A1 | 4/2005 | Watanabe et al. |
| 2007/0293986 A1 | 12/2007 | Nagatsuka et al. |
| 2013/0211593 A1 | 8/2013 | Domae et al. |

FOREIGN PATENT DOCUMENTS

| | | |
|---|---|---|
| EP | 1415771 A2 | 5/2004 |
| EP | 1522912 A2 | 4/2005 |
| EP | 1867444 A2 | 12/2007 |
| JP | S6071183 A | 4/1985 |
| JP | H03288210 A | 12/1991 |
| JP | H05069362 A | 3/1993 |
| JP | H0560792 U | 8/1993 |
| JP | 2003094367 A | 4/2003 |
| JP | 2003150220 A | 5/2003 |
| JP | 2004127190 | 4/2004 |
| JP | 2004148433 A | 5/2004 |
| JP | 2005111618 A | 4/2005 |
| JP | 2006285685 | 10/2006 |
| JP | 20007334678 | 12/2007 |
| JP | 2015044274 A | 3/2015 |
| JP | 2015100866 A | 6/2015 |
| JP | 2016020011 A | 2/2016 |
| JP | 2016078153 A | 5/2016 |
| WO | 2012066819 A1 | 5/2012 |

OTHER PUBLICATIONS

Japanese Search Report from Registered Searching Organization dated Sep. 25, 2018, for Japanese Patent Application No. 2016-173015.

German Office Action dated Dec. 10, 2019, for German Patent Application No. 102017119393.6.

* cited by examiner

FIG. 9

| NAME | OPERATION AND OPERATION TIME | OUTPUT SIGNAL | VALUE | INPUT SIGNAL | VALUE | MOVING DISTANCE |
|---|---|---|---|---|---|---|
| Claw1 | LINEAR·1/sec | DO[1] | ON | DI[1] | ON | 30mm |
| Claw1 | LINEAR·1/sec | DO[2] | ON | DI[2] | ON | 0mm |
| Claw2 | LINEAR·1/sec | DO[1] | ON | DI[3] | ON | 30mm |
| Claw2 | LINEAR·1/sec | DO[2] | ON | DI[4] | ON | 0mm |
| Claw3 | LINEAR·1/sec | DO[1] | ON | DI[5] | ON | 30mm |
| Claw3 | LINEAR·1/sec | DO[2] | ON | DI[6] | ON | 0mm |

FIG. 11
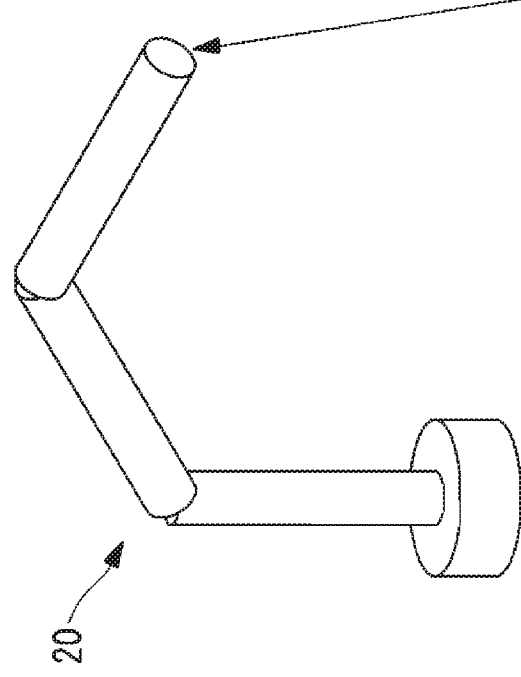
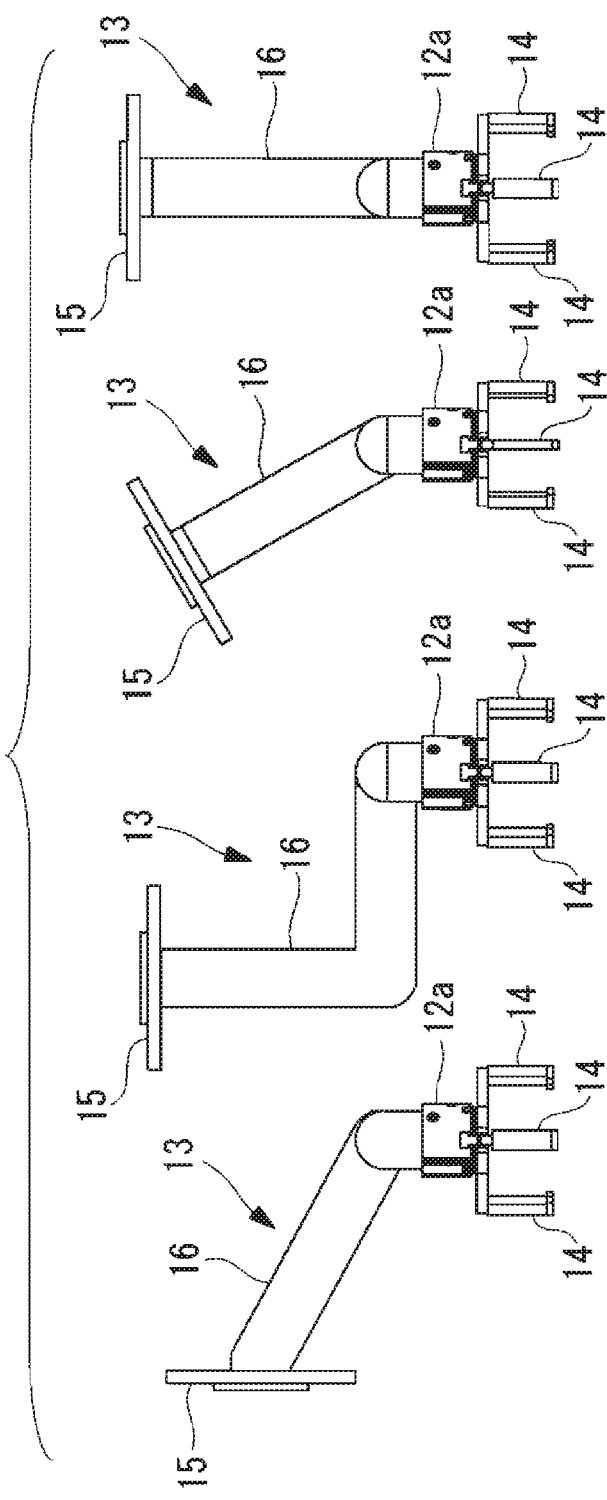

ROBOT SIMULATION APPARATUS

CROSS-REFERENCE TO RELATED APPLICATIONS

This application claims the benefit of and priority to Japanese Patent Application No. 2016-173015, filed on Sep. 5, 2016, the entire content of which is incorporated herein by reference.

FIELD OF THE INVENTION

The present invention relates to a robot simulation apparatus.

BACKGROUND OF THE INVENTION

Conventionally, a robot simulation apparatus that simulates operation of a robot on a screen is known (for example, see Japanese Unexamined Patent Application, Publication No. 2007-334678). While carrying out the simulation of the robot provided with hands, the robot simulation apparatus changes a shape model of the hands to prevent an interference between the hands and a case when the hands take out workpieces piled in the case from the case, and the robot simulation apparatus acquires dimension data of actual hands from the changed shape model of the hands.

An aspect of the present invention provides a robot simulation apparatus including: a tool information setting unit that sets a type of one or more hands provided on a tool; a hand model storage unit that stores types of the hands in association with three-dimensional models and tool coordinate systems of the hands; a hand position and posture setting unit that sets a position and a posture of each of the hands of the tool attached to an attachment surface of a robot; and a robot model generation unit that generates a three-dimensional model of the robot, in which the three-dimensional model of the hands read from the hand model storage unit based on the type of the hands set by the tool information setting unit is attached to the attachment surface based on the positions and the postures of the hands set by the hand position and posture setting unit, and that sets a tool coordinate system, wherein the three-dimensional model and the tool coordinate system of the robot generated by the robot model generation unit are used to perform a simulation of the robot provided with the tool attached to the attachment surface.

BRIEF DESCRIPTION OF DRAWINGS

FIG. 9 is a diagram showing a correspondence between signals input and output through a signal setting unit included in the robot simulation apparatus of FIG. 1 and operations of the claws.

FIG. 11 is a diagram showing a case of generating three-dimensional models of a plurality of tools, showing another modification of the robot simulation apparatus of FIG. 1.

DESCRIPTION OF EMBODIMENTS

A robot simulation apparatus 1 according to an embodiment of the present invention will be described with reference to the drawings.

A computer, such as a personal computer, realizes the robot simulation apparatus 1 according to the present embodiment.

Figure 1:
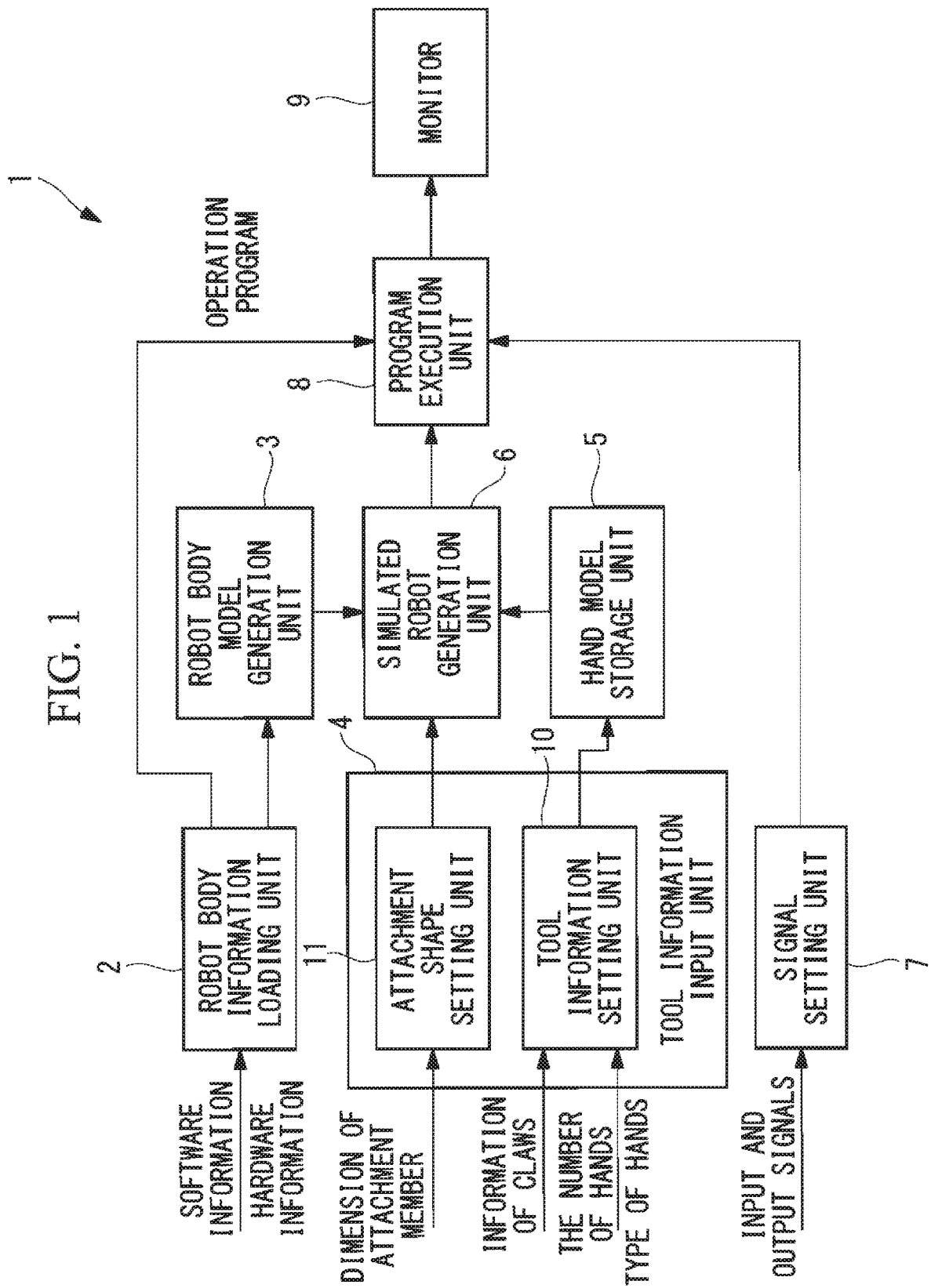
FIG. 1 is a block diagram showing a robot simulation apparatus according to an embodiment of the present invention.

The robot simulation apparatus 1 is an apparatus that simulates a robot body 20 and a tool 13 attached to an attachment surface 15 at a tip of an arm of the robot body 20. As shown in FIG. 1, the robot simulation apparatus 1 includes: a robot body information loading unit 2 that loads hardware information and software information output from a control apparatus of a robot; a robot body model generation unit (robot model generation unit) 3 that generates a three-dimensional model of the robot body 20 based on the hardware information and the software information loaded by the robot body information loading unit 2; a tool information input unit 4 that inputs information of the tool 13; a hand model storage unit 5 that stores three-dimensional models of hands 12 of the tool 13; a simulated robot generation unit 6 that generates a three-dimensional model of the robot provided with the tool 13 on the attachment surface 15 of the robot body 20 based on the information of the tool 13 input by the tool information input unit 4, the three-dimensional models of the hands 12 stored in the hand model storage unit 5, and the three-dimensional model of the robot body 20 generated by the robot body model generation unit 3; a signal setting unit 7 that sets a signal for operating the tool 13; a program execution unit 8 that uses the generated three-dimensional model of the robot to execute an operation program included in the software information of the robot; and a monitor 9 that displays execution results.

The information loaded from the control apparatus of the robot includes identification information of the robot, parameters, such as acceleration, maximum speed, and operating range of each axis, and an operation program.

The robot body model generation unit 3 is configured to generate a three-dimensional model of the robot body 20 operated on the robot simulation apparatus 1 based on the hardware information loaded from the robot to set the acceleration, the maximum speed, and the operating range of each axis.

As shown in FIG. 1, the tool information input unit 4 includes: a tool information setting unit 10 that sets the number and the type of hands 12 provided on the tool 13; and an attachment shape setting unit (hand position and posture setting unit) 11 that sets the shape of an attachment member 16 for attaching the hands 12 to the attachment surface 15 of the robot.

Figure 2:
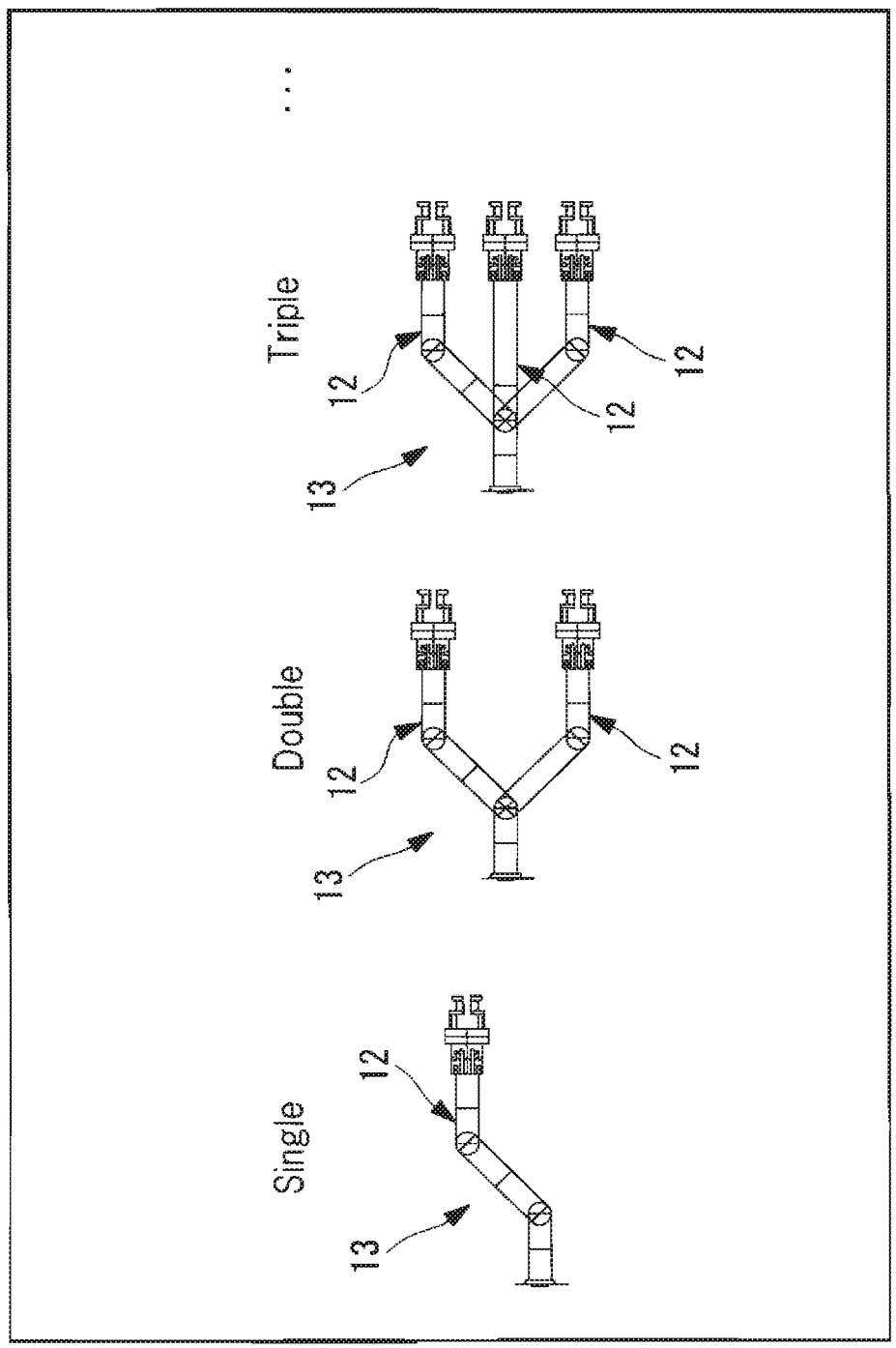
FIG. 2 is a diagram showing an example of a screen for inputting the number of hands through a tool information setting unit included in the robot simulation apparatus of FIG. 1.

As shown in FIG. 2, the tool information setting unit 10 is configured to display a plurality of types of tools 13 including different numbers of hands 12 on the monitor 9 to have a user make a selection to set the number of hands 12 provided on the tool 13. The user may input a value to set the number of hands 12.

Figure 3:
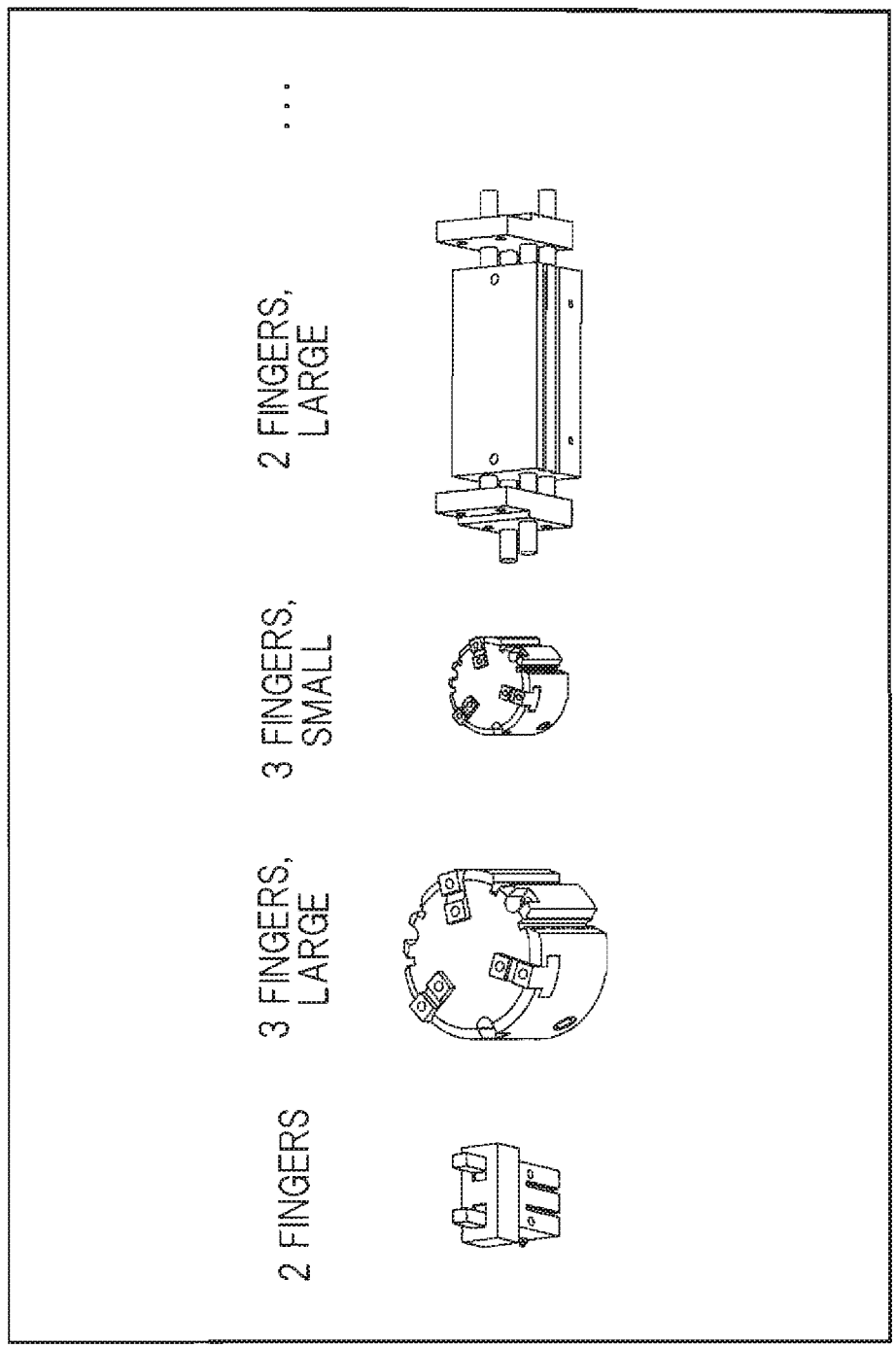
FIG. 3 is a diagram showing an example of a screen for inputting a type of hand through the tool information setting unit included in the robot simulation apparatus of FIG. 1.

As shown in FIG. 3, the tool information setting unit 10 is configured to display different types of hands 12 on the monitor 9 to have the user make a selection to set the type of hands 12 provided on the tool 13.

Identification information indicating the types of hands 12 and the three-dimensional models of the hands 12 are associated and stored in the hand model storage unit 5, and when the type of hands 12 is set by the tool information setting unit 10, the three-dimensional model of the hands 12 stored in the hand model storage unit 5 in association with the type is read. Three-dimensional models of a hand body 12a and claws 14 compatible with the hand body 12a are individually stored in the hand model storage unit 5.

The tool information setting unit 10 is configured to set information of one or more claws 14 provided on the hands 12 after the type of hands 12 is input. When the type of hands 12 is set, the three-dimensional models of the hand body 12a stored in the hand model storage unit 5 in association with the type and the claws 14 compatible with the hand body 12a are read.

Figure 4:
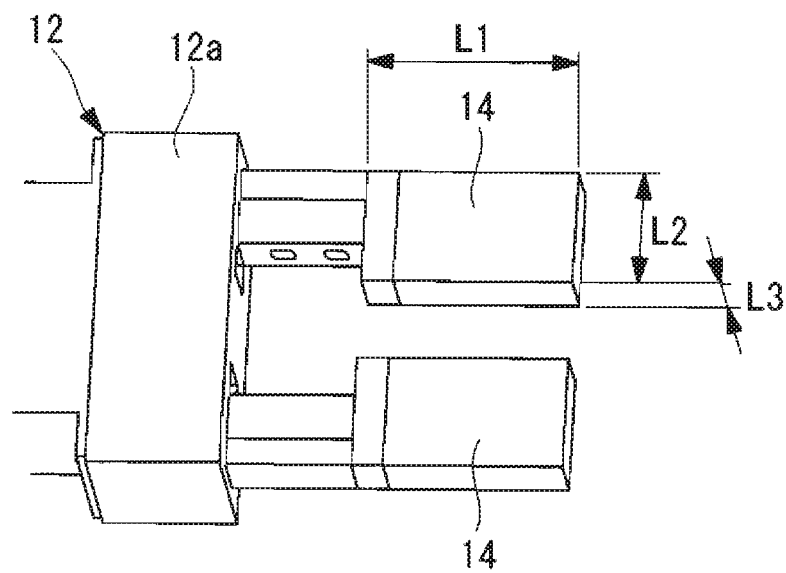
FIG. 4 is a diagram showing an example of a screen for inputting a dimension of claws of the hand through the tool information setting unit included in the robot simulation apparatus of FIG. 1.

The information of the claws 14 to be set can include the shape and the dimension of the claws 14. The shapes of the claws 14 compatible with the hand body 12a read from the hand model storage unit 5 are listed and displayed on the monitor 9 to have the user select a desired type of claws 14, and as shown in FIG. 4, the user inputs the dimension (such as length L1, width L2, and thickness L3) for specifying the selected type of claws 14.

Figure 5:
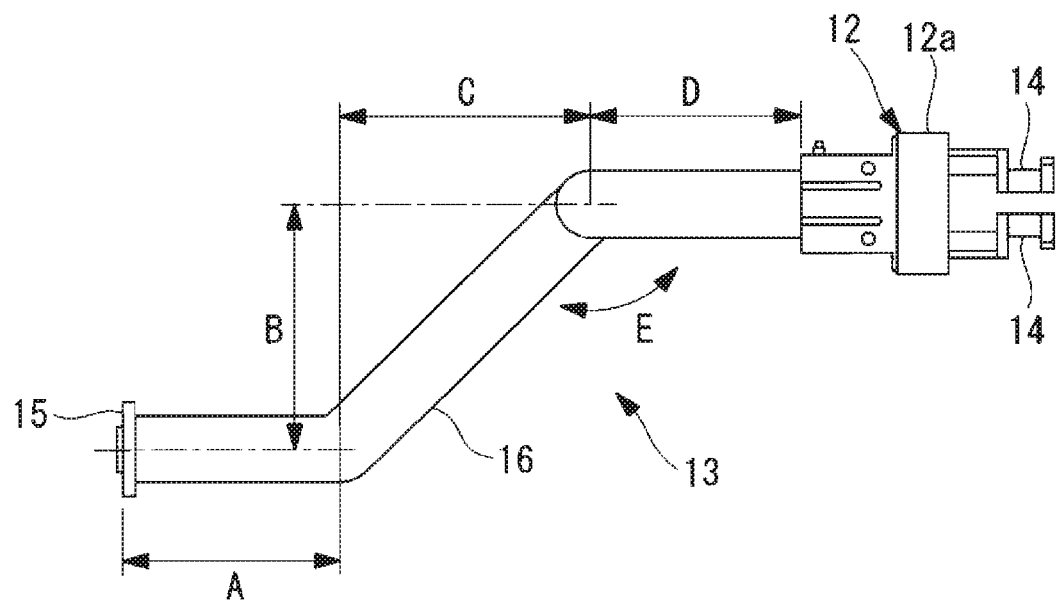
FIG. 5 is a diagram showing an example of a screen for inputting a shape of an attachment member through an attachment shape setting unit included in the robot simulation apparatus of FIG. 1.

As shown in FIG. 5, the attachment shape setting unit 11 is configured to have the user set dimensions A to E of the attachment member 16 in a simplified shape connecting from the attachment surface 15 to the hand body 12a. This allows setting the position and the posture of the hand body 12a with respect to the attachment surface 15 of the robot.

Figure 7:
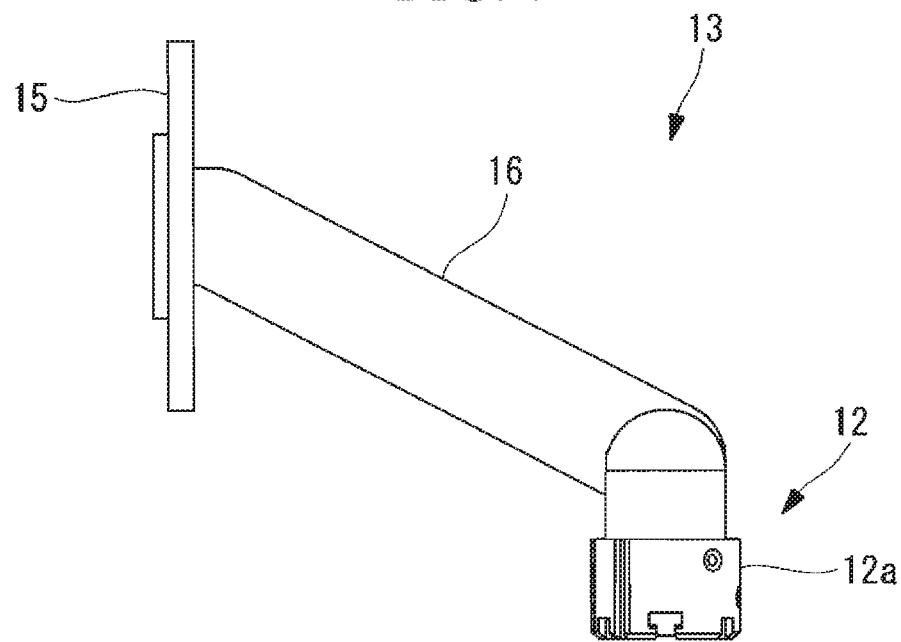
FIG. 7 is a diagram showing an example of a three-dimensional model with a combination of a hand body and an attachment member generated by the simulated robot generation unit of the robot simulation apparatus of FIG. 1.
Figure 8:
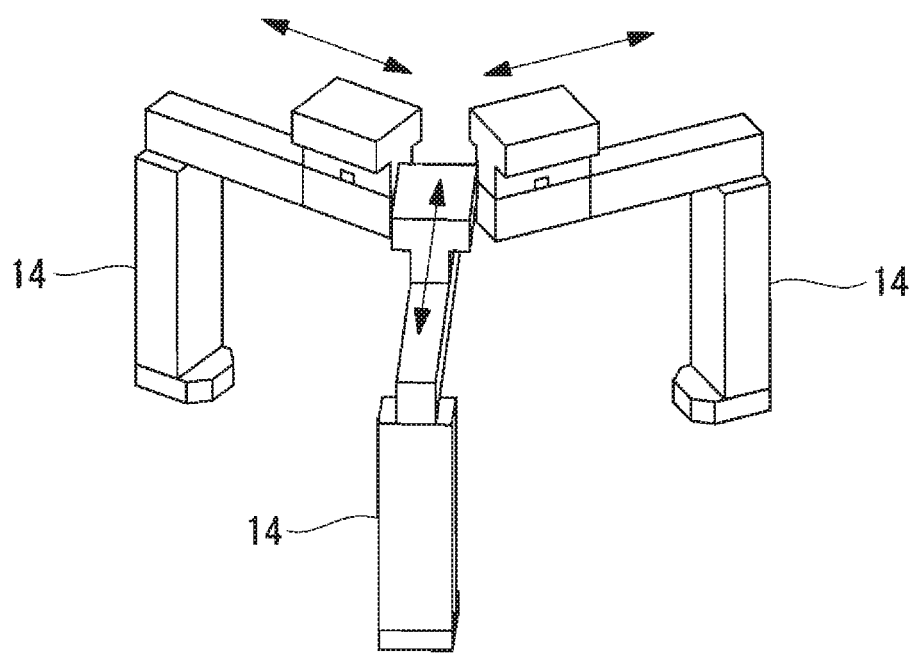
FIG. 8 is a perspective view showing an example of a three-dimensional model of the claws generated by the simulated robot generation unit of the robot simulation apparatus of FIG. 1.

The simulated robot generation unit 6 generates a three-dimensional model of the tool 13 with a combination of the selected three-dimensional model of the hand body 12a and the set attachment member 16 as shown in FIG. 7 and generates a three-dimensional model of the set claws 14 separately from the three-dimensional model of the hand body 12a as shown in FIG. 8. The simulated robot generation unit 6 is also configured to generate a three-dimensional model of the robot by attaching the generated three-dimensional model of the tool 13 to the attachment surface 15 of the three-dimensional model of the robot body 20 generated by the robot body model generation unit 3 and movably combine the generated three-dimensional model of the claws 14 with the hand body 12a to set a tool coordinate system.

Figure 6:
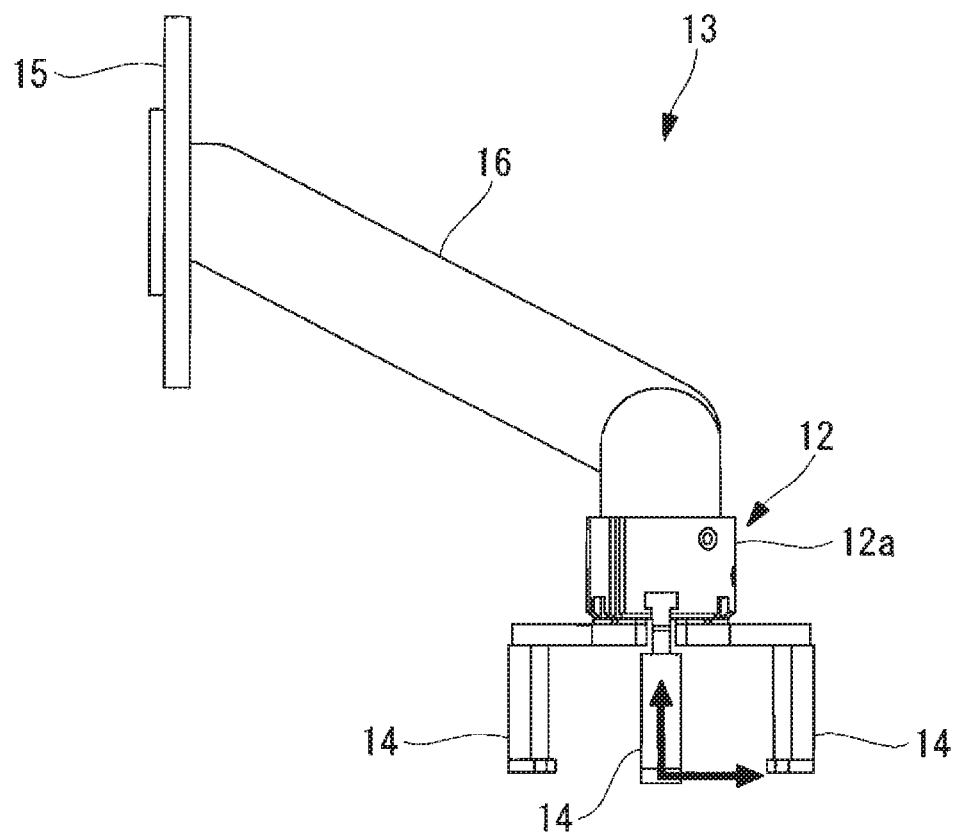
FIG. 6 is a diagram showing an example of setting a tool coordinate system through a simulated robot generation unit included in the robot simulation apparatus of FIG. 1.

The simulated robot generation unit 6 is configured to set the tool coordinate system at a center position of two or more claws 14 provided on the hands 12 as shown for example in FIG. 6.

As shown in FIG. 9, the signal setting unit 7 is configured to set a correspondence between the claws 14 of the hands 12, and output signals for starting work of the claws 14 and input signals for notifying the robot body 20 of the end of the work. The input and output signals of three claws 14 (Claw 1, Claw 2, and Claw 3), and the moving distance, the operation and operation time are associated in FIG. 9.

An action of the robot simulation apparatus 1 according to the present embodiment configured in this way will be described.

The robot body information loading unit 2 reads the information of the robot body 20 from the control apparatus of the robot to use the robot simulation apparatus 1 according to the present embodiment to thereby perform a simulation of the robot provided with the tool 13.

As a result, the robot body model generation unit 3 generates a three-dimensional model of the robot body 20 based on the hardware information loaded by the robot body information loading unit 2.

The user then uses the tool information input unit 4 to input the number and the type of hands 12 provided on the tool 13. As a result, the input number of three-dimensional models of the hands 12 corresponding to the input type are read from the hand model storage unit 5.

When the type of hands 12 provided on the tool 13 is set, the three-dimensional models of the hand body 12a stored in the hand model storage unit 5 in association with the set type and the three-dimensional models of the claws 14 compatible with the hand body 12a are read, and read candidates of the claws 14 are displayed on the monitor 9. Therefore, when the user selects one of the claws 14, a screen for the user to input the dimension of the claws 14 is displayed. Accordingly, the user inputs the dimension of the claws 14 to generate a three-dimensional model of the hands 12 including the claws 14 in desired shape and size.

When the user uses the attachment shape setting unit 11 to set the dimension of the attachment member 16 in the simplified shape connecting from the attachment surface 15 to the hand body 12a, one or more hand bodies 12a are fixed to the robot body 20 at the positions and postures with respect to the attachment surface 15 determined by the shape of the attachment member 16. A three-dimensional model of the robot including the claws 14 that move relative to the hand bodies 12a is generated, and a tool coordinate system with the origin between the claws 14 of the hand 12 is set.

The user then uses the signal setting unit 7 to set the correspondence between the claws 14 of the hands 12, and the output signals for starting the work of the claws 14 and the input signals for notifying the robot body 20 of the end of the work. This allows operating the claws 14 of the hands 12 according to the output signals written in execution lines of the operation program of the robot, and the input of the input signals for ending the operation of the claws 14 of the hands 12 can be detected to make a transition to the next execution line.

Subsequently, the program execution unit 8 can activate the operation program included in the software information loaded from the control unit of the robot and operate the three-dimensional model of the robot on the monitor 9 according to the operation program to thereby perform the simulation of the robot. Examples of simulation results of the robot to be output include cycle time, maximum load, presence/absence of interference, and reachable/unreachable. When the cycle time or the maximum load is greater than a predetermined reference, when there is an interference, or when the operating range is insufficient, the user can change the shape of attachment member 16 or the type of hands 12 to evaluate the positions and the postures of the hands 12 compatible with all conditions.

In this way, according to the robot simulation apparatus 1 of the present embodiment, the prepared hand models are used to change the positions and the postures of the hands 12 to perform the simulation, instead of modifying the shape model of the hands 12 when there is an interference with a peripheral device. Therefore, the tool 13 can be designed without losing necessary functions of the tool 13, while avoiding an interference with a peripheral device.

Figure 10B:
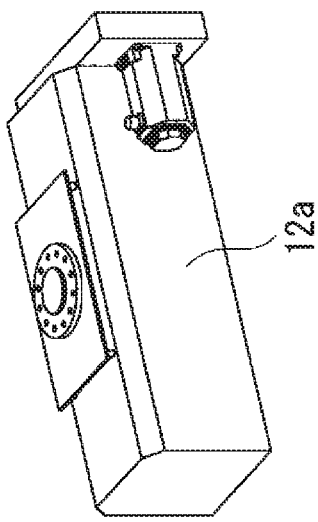
FIG. 10B is a perspective view showing an example of the hand body, showing a modification of the robot simulation apparatus of FIG. 1.
Figure 10C:
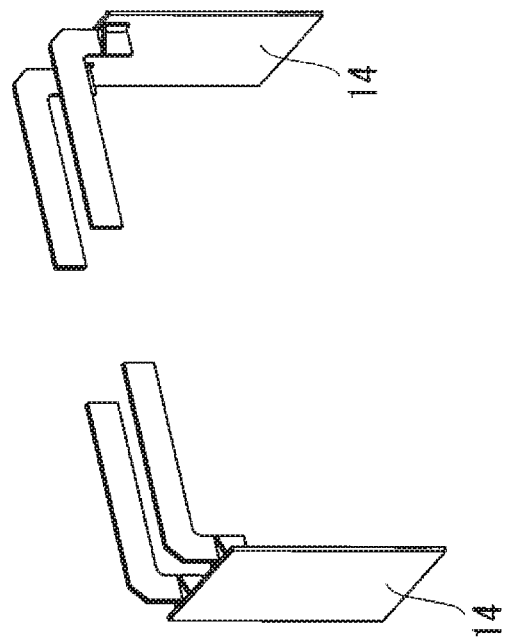
FIG. 10C is a perspective view showing an example of the claws, showing a modification of the robot simulation apparatus of FIG. 1.
Figure 10A:
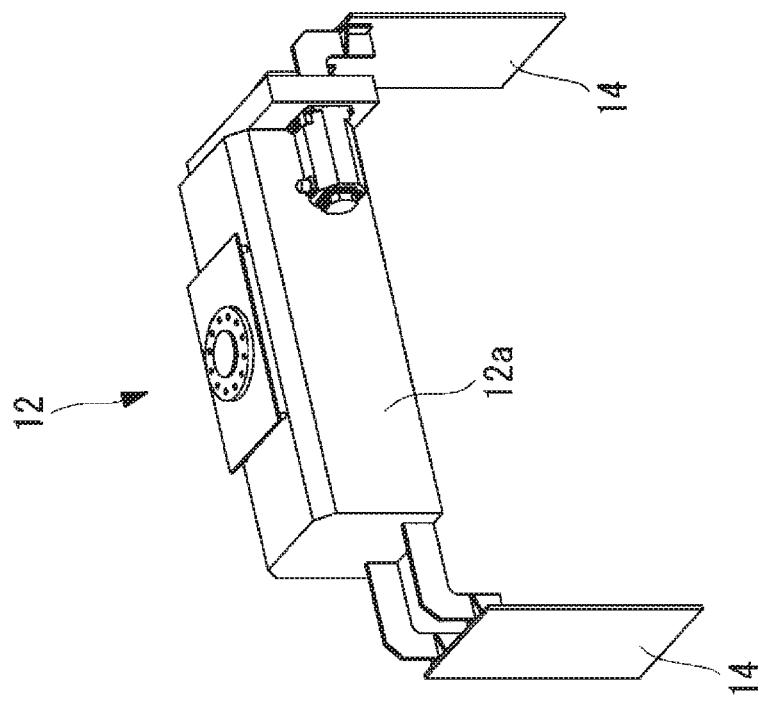
FIG. 10A is a perspective view showing an example of the hand driven by an additional axis of the robot body, showing a modification of the robot simulation apparatus of FIG. 1.

In the present embodiment, the input and output signals set by the signal setting unit 7 are used, and the claws 14 of the hands 12 are operated based on the output signals written in the operation program. However, as shown in FIGS. 10A to 10C, the hand body 12a with a system of operating the claws 14 through an additional axis of the robot body 20 may be adopted, and the hand 12 for driving the claws 14 through a work command for the additional axis, just like work commands for other drive axes of the robot body 20, may be adopted.

In the present embodiment, the three-dimensional models of a single tool 13 including one or more hands 12 are generated, and the operation of the robot attached to the attachment surface 15 of the robot body 20 is simulated. Instead of this, three-dimensional models of two or more tools 13 may be generated to perform the simulation while replacing the tools 13 as shown in FIG. 11. In this way, the simulation results, such as cycle time, maximum load, presence/absence of interference, and reachable/unreachable, can be evaluated by comparing the simulation results between the tools 13.

From the above-described embodiment, the following invention is derived.

An aspect of the present invention provides a robot simulation apparatus including: a tool information setting unit that sets a type of one or more hands provided on a tool; a hand model storage unit that stores types of the hands in association with three-dimensional models and tool coordinate systems of the hands; a hand position and posture setting unit that sets a position and a posture of each of the hands of the tool attached to an attachment surface of a robot; and a robot model generation unit that generates a three-dimensional model of the robot, in which the three-dimensional model of the hands read from the hand model storage unit based on the type of the hands set by the tool information setting unit is attached to the attachment surface based on the positions and the postures of the hands set by the hand position and posture setting unit, and that sets a tool coordinate system, wherein the three-dimensional model and the tool coordinate system of the robot generated by the robot model generation unit are used to perform a simulation of the robot provided with the tool attached to the attachment surface.

According to the present aspect, when the tool information setting unit sets the type of one or more hands provided on the tool, and the hand position and posture setting unit sets the position and the posture of each hand in the tool attached to the attachment surface of the robot, the three-dimensional model and the tool coordinate system of the hands stored in the hand model storage unit are read, and the robot model generation unit attaches the tool to the attachment surface based on the set positions and postures to generate the three-dimensional model of the robot in which the tool coordinate system is set. In this way, the tool coordinate system of the hands is used to perform the simulation of the robot provided with the tool attached to the attachment surface.

That is, according to the present aspect, the three-dimensional model of the tool and the tool coordinate system stored in advance are selected just by inputting necessary information, and this allows simply performing the simulation of the robot provided with the tool attached to the attachment surface of the robot at the desired position and angle. Therefore, the input information can be changed to simply perform the simulation of the robot equipped with various tools, and interference check, evaluation of cycle time, and the like of each tool can be simply performed. In this case, the three-dimensional model of the hands stored in advance is used, and the simulation can be performed based on the tool satisfying necessary functions.

In the aspect, the tool may include the hands and an attachment member for attaching the hands to the robot, and the hand position and posture setting unit may set a shape of the attachment member.

In this way, the hand position and posture setting unit sets the shape of the attachment member, and the positions and the postures of the hands attached to the attachment surface of the robot can be simply set.

In the aspect, the hands may include a hand body and one or more claws that move relative to the hand body, and the tool information setting unit may set a type and a size of the claws.

In this way, the simulation can be performed by setting desired type and size of one or more claws moved by a movable portion of the hand body in the operation of the hands.

In the aspect, a signal setting unit that sets output signals output from the robot when the hands start operation of the claws and that sets input signals input to the robot from the hands when the operation of the claws is completed may be further included.

In this way, the simulation of operating the claws by operating the movable portion of the hand body during the operation of the robot can be performed based on the input and output signals written in an operation program of the robot.

In the aspect, a simulation of the three-dimensional model of the hands may be performed separately from the three-dimensional model of the robot.

In this way, the tool is attached to the attachment surface of the robot, and the tool moves in various directions according to the operation of the robot. Therefore, the three-dimensional model of the hands is separated from the three-dimensional model of the robot in the simulation, and the operation of the hands can be checked at a position where the operation can be easily viewed.

In the aspect, the claws may be driven by an additional axis of the robot.

In this way, the simulation of the robot including the tool can be performed by driving the hands based on an operation command similar to an operation command for each drive axis for operating the robot.

In the aspect, the tool information setting unit may be able to set information of a plurality of the tools, and the robot model generation unit may alternatively select one of the tools set by the tool information setting unit to perform the simulation of the robot.

In this way, a plurality of tools can be set, and one of the tools can be selected. The simulation based on the robot model including the three-dimensional model of the tool attached to the attachment surface can be carried out by switching the set tool, and the tools can be evaluated while comparing the interference, the cycle time, and the like.

The invention claimed is:

1. A robot simulation apparatus that performs a simulation of a robot configured such that at least one tool including one of a plurality of types of hands is attached, the at least one tool including an attachment member and being attached with an attachment surface of the robot by the attachment member, the robot simulation apparatus comprising:
- a storage that stores the plurality of types of hands in association with three-dimensional models and tool coordinate systems of the plurality of types of hands; and
- at least one processor, the processor being configured to:
  - receive a selection of one of the plurality of types of hands;
  - receive an input of a shape and dimension of the attachment member;
  - set, according to the received input, a position and a posture of a hand of the selected type with respect to the attachment surface;
  - read, from the storage, a three-dimensional model in association with the hand of selected type;
  - generate a three-dimensional model of the robot, in which the read three-dimensional model is attached to the attachment surface based on the set position and posture;
  - set tool coordinate system; and
  - perform a simulation of the robot in which the at least one tool is attached with the attachment surface by using the generated three-dimensional model and the set tool coordinate system.

2. The robot simulation apparatus according to claim 1, wherein:
the hands comprise a hand body and one or more claws that move relative to the hand body, and
the processor is configured to receive an input of a type and a size of the claws.

3. The robot simulation apparatus according to claim 2, wherein the processor is configured to set output signals output from the robot when the hands start operation of the claws and set input signals input to the robot from the hands when the operation of the claws is completed.

4. The robot simulation apparatus according to claim 2, wherein:
the claws are driven by an additional axis of the robot.

5. The robot simulation apparatus according to claim 1, wherein:
the processor is configured to perform a simulation of the three-dimensional model of the hands separately from the three-dimensional model of the robot.

6. The robot simulation apparatus according to claim 1, wherein:
the at least one tool comprises a plurality of tools, and the processor is configured to alternatively select one of the plurality of tools to perform the simulation of the robot.

* * * * *